(12) United States Patent
Cervenka et al.

(10) Patent No.: US 8,913,650 B2
(45) Date of Patent: Dec. 16, 2014

(54) MEASURING BIT-ERROR-RATES OF FORWARD ERROR CORRECTION CODE ENCODED SIGNALS

(75) Inventors: James M. Cervenka, Heath, TX (US); John Fasolino, Allen, TX (US); Steven Franks, Garland, TX (US); Stephen Clark, Celina, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1361 days.

(21) Appl. No.: 12/565,964

(22) Filed: Sep. 24, 2009

(65) Prior Publication Data

US 2011/0069748 A1   Mar. 24, 2011

(51) Int. Cl.
*H01S 3/00* (2006.01)
*H03K 7/00* (2006.01)
*H04L 1/20* (2006.01)

(52) U.S. Cl.
CPC ...................................... *H04L 1/203* (2013.01)
USPC ........... 375/224; 375/227; 375/225; 359/333; 359/337.11; 359/341.4

(58) Field of Classification Search
USPC ............. 398/9, 16, 15, 20, 22, 23, 24, 25, 26, 398/27, 28, 113, 118, 119, 120, 123, 128, 398/130, 135, 137, 140, 162, 182, 202; 356/3.11, 3.12, 3.16, 73.1; 359/107, 359/333, 337.13, 341.1, 341.41, 341.4, 359/341.42, 3.11, 3.12, 3.16, 73.1; 375/211, 213, 295, 311, 312, 316, 318, 375/297, 296, 345, 358, 354, 219, 220, 224, 375/225, 227, 228, 240.26, 240.27, 346; 389/9, 16, 15, 20, 22–28, 113, 389/118–120, 123, 128, 130, 135, 137, 140, 389/162, 182, 202

See application file for complete search history.

(56) References Cited

U.S. PATENT DOCUMENTS

| 6,580,531 | B1 * | 6/2003 | Swanson et al. ................... 398/5 |
| 7,822,124 | B1 * | 10/2010 | Rezvani .................... 375/240.27 |
| 2006/0083324 | A1 * | 4/2006 | DesJardins et al. ........... 375/260 |
| 2008/0144993 | A1 * | 6/2008 | Bottari et al. .................... 385/14 |
| 2009/0092192 | A1 * | 4/2009 | Erving et al. ................. 375/260 |
| 2011/0275399 | A1 * | 11/2011 | Englund et al. ............... 455/513 |

* cited by examiner

*Primary Examiner* — Sam K Ahn
*Assistant Examiner* — Linda Wong (57) ABSTRACT

A device may include one or more components and a processor. The one or more components may obtain bit-error-rates of a signal and signal-to-noise ratios of the signal. The processor may select a target signal-to-noise ratio for the signal, determine a target noise level based on the target signal-to-noise ratio, set a noise level of the signal to the target noise level, determine a signal-to-noise ratio of the signal via the one or more components, adjust the noise level of the signal based on the determined signal-to-noise ratio, to stabilize the signal-to-noise ratio, determine a bit-error-rate of the signal via the one or more components, and record the bit-error-rate.

10 Claims, 10 Drawing Sheets

MEASURING BIT-ERROR-RATES OF FORWARD ERROR CORRECTION CODE ENCODED SIGNALS

BACKGROUND INFORMATION

When a device in a digital communication system receives a signal that is degraded due to channel noise, the device may recover from the signal digital data that contains bit errors. To eliminate or reduce such errors, some communication devices may employ encoding and decoding systems, respectively.

Figure 1A:
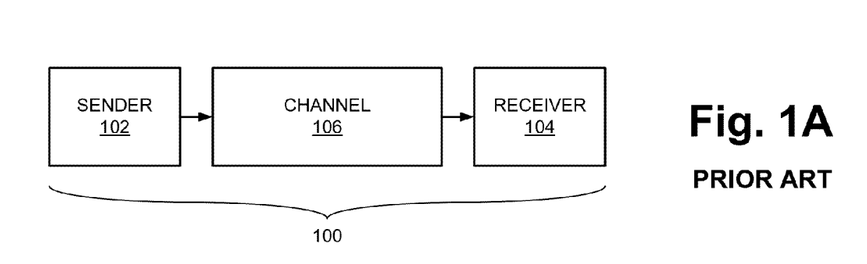
FIG. 1A shows exemplary transmission and reception of digital data over a noisy channel.
Figure 1B:
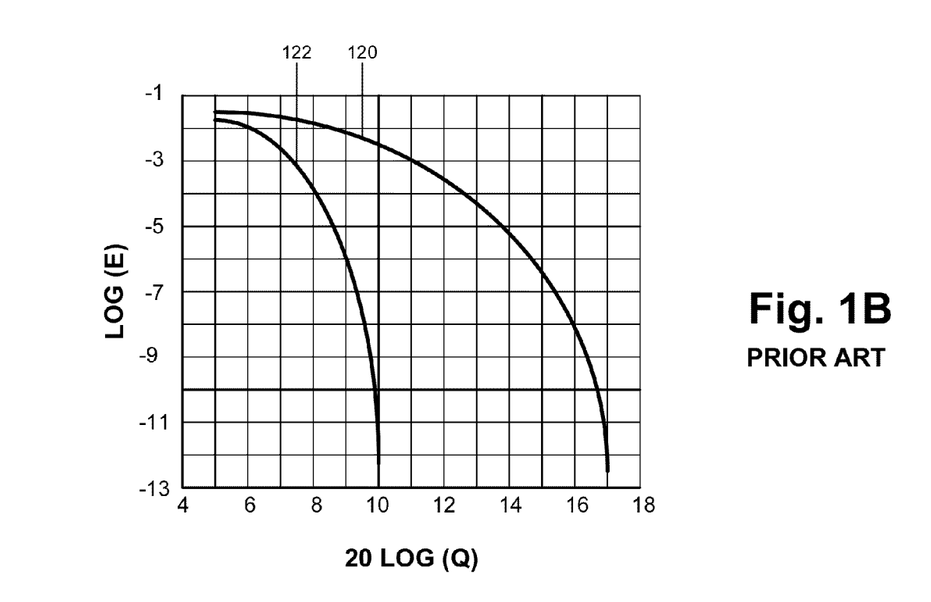
FIG. 1B shows exemplary graphs of bit-error-rate (BER) as functions of signal-to-noise ratio (SNR)

FIGS. 1A and 1B illustrate using encoding and decoding systems for reducing communication errors. FIG. 1A shows exemplary transmission and reception of digital data over a noisy channel. As shown, a communication system 100 includes a sender 102 (or a transmitter 102), a receiver 104, and a channel 106. For the purposes of simplicity and ease of understanding, other components of communication system 100 (e.g., radio frequency (RF) components (e.g., modulator, demodulator, etc.)) are not illustrated.

Sender 102 converts data (e.g., a stream of 1's and 0's) into a signal and transmits the signal to receiver 104. Receiver 104 receives the signal from sender 102, recovers the data from the signal, and outputs the data. Channel 106 provides a path through which the signal from sender 102 passes to reach receiver 104. While the signal is passing through channel 106, channel 106 injects noise into the signal. Consequently, receiver 104 recovers data from the received signal that includes errors (i.e., bits different from those in the original data).

In the above, a rate at which the errors occur in the recovered data is typically known as a bit-error-rate (BER). In system 100, the BER may depend on a ratio of power of the transmitted signal to power of the injected noise. This ratio is typically known as the signal-to-noise ratio (SNR). FIG. 1B shows a curve 120 of BER E as a function of SNR Q in a system that does not use encoding and decoding systems. As shown by BER curve 120, as Q increases, BER E decreases.

For a given SNR, communication system 100 (FIG. 1A) can decrease BER by using encoding and decoding systems. For example, sender 102 may employ a forward error correction (FEC) code encoder to encode the original data, convert the encoded data into a signal, and send the signal over channel 106. When receiver 104 receives the signal, receiver 104 may recover the encoded data from the signal, and decode the recovered data using a FEC code decoder. In decoding the recovered data, receiver 104 may detect and/or correct bit errors in the data. Such error corrections allow communication system 100 to reduce its BER at a particular SNR.

A FEC code encoder may encode data in accordance with one of many methods for generating different codes (i.e., bit patterns). Some FEC code encoders, for example, may generate block codes (e.g., Reed-Solomon codes, Hamming codes, etc.), convolutional codes, etc. Similarly, for each type of FEC codes, a corresponding FEC code decoder may decode the FEC codes to obtain the original data.

FIG. 1B also shows a curve 122 of BER E as a function of SNR in a communication system that implements FEC. As shown in curve 122, as SNR Q increases, E decreases. However, for a given value of BER, BER on curve 122 is at a smaller SNR than BER on curve 120. For example, when log (E) is approximately at −11, 20 log (Q) for BER curve 120 and BER curve 122 are 17 and 10, respectively. More generally, communication system 100 with FEC systems may obtain the same BERs at smaller SNRs than ones without the FEC systems.

DETAILED DESCRIPTION OF PREFERRED EMBODIMENTS

The following detailed description refers to the accompanying drawings. The same reference numbers in different drawings may identify the same or similar elements.

Figure 2:
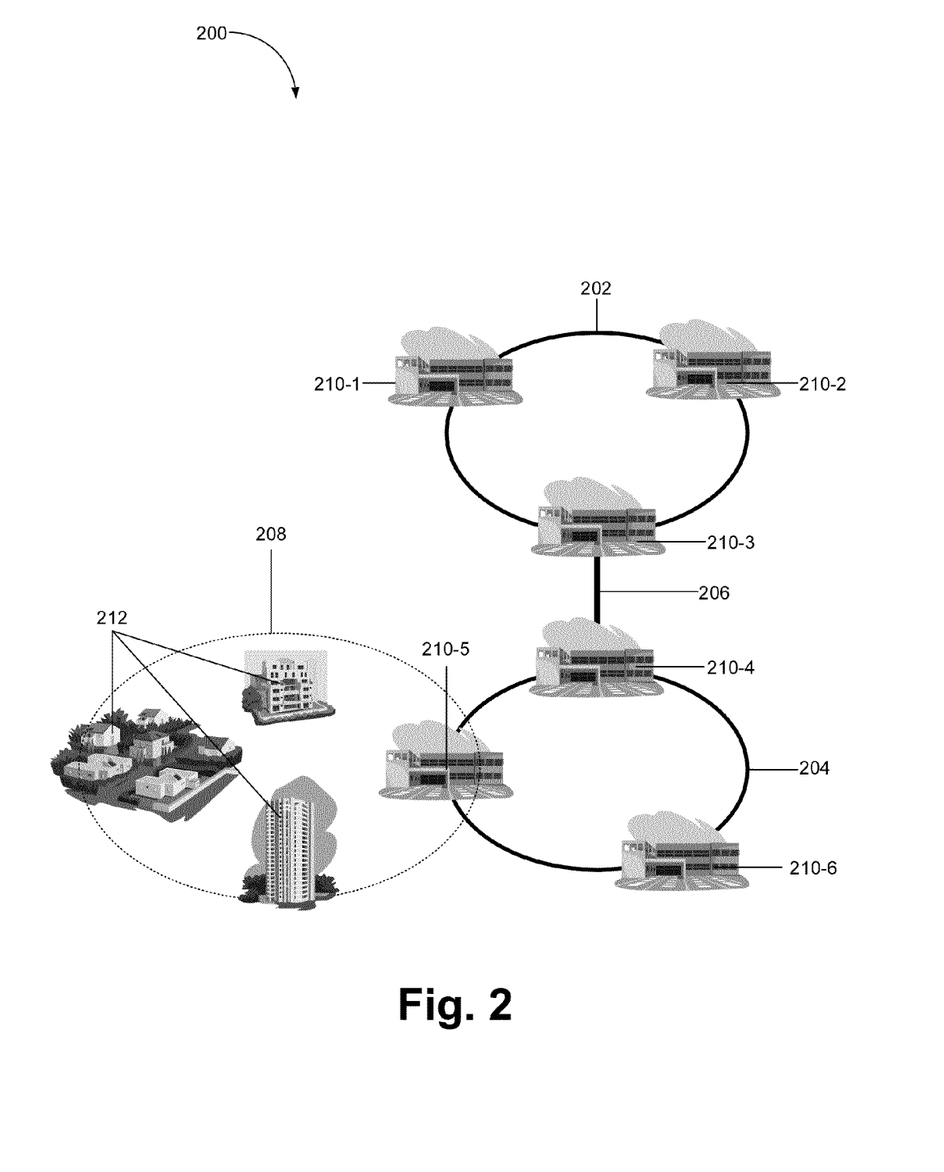
FIG. 2 illustrates an exemplary optical network in which concepts described herein may be implemented.

As described below, systems are provided for accurately measuring bit error rates (BERs) of forward error correction (FEC) code encoded signals. FIG. 2 shows an exemplary optical network 200 in which concepts described herein may be implemented. As shown, optical network 200 may include metro/regional networks 202 and 204, long haul or ultra-long haul. optical lines 206, and edge network 208. Depending on the implementation, optical network 200 may include additional, fewer, or different optical networks and optical lines than those illustrated in FIG. 2. For example, in one implementation, optical network 200 may include additional edge networks and/or metro/regional networks that are interconnected by Synchronous Optical Network (SONET) rings.

Metro/regional networks 202 and 204 may include optical fibers and central office hubs that are interconnected by the optical fibers. The optical fibers may form the backbone of metro/regional optical networks 202 and 204. The central office hubs, some of which are illustrated as 210-1 through 210-6 (individually referred to as central office hub 210-x and collectively as central office hubs 210), may provide telecommunication services to subscribers, such as telephone service, access to the Internet, cable television programs, etc., via optical line terminals. Central office hub 210-x may house telecommunication equipment, including switches, optical line terminals, etc.

In some implementations, central office hubs 210 may include one or more testing devices for accurately measuring BERs of FEC code encoded signal over a particular SNR range. For example, in one implementation, a transmitter at one central office hub 210-x (e.g., central office hub 210-1) may generate and send a testing signal to a receiver at another central office hub 210-x (e.g., central office hub 210-5). Other testing devices in central office 210-x may measure BER of the signal as a function of SNR.

Long haul optical lines 206 may include optical fibers that extend from metro/regional optical networks 202 to metro/regional optical network 204.

Edge network 208 may include optical networks that provide user access to metro/regional optical network 204. As shown in FIG. 2, edge network 208 may include access points 212 (e.g., office buildings, residential area, etc.) via which end customers may obtain communication services from central office hub 210-5. In some implementations, the testing devices for measuring BERs of FEC code encoded signals may be placed in or at access points 212.

Figure 3:
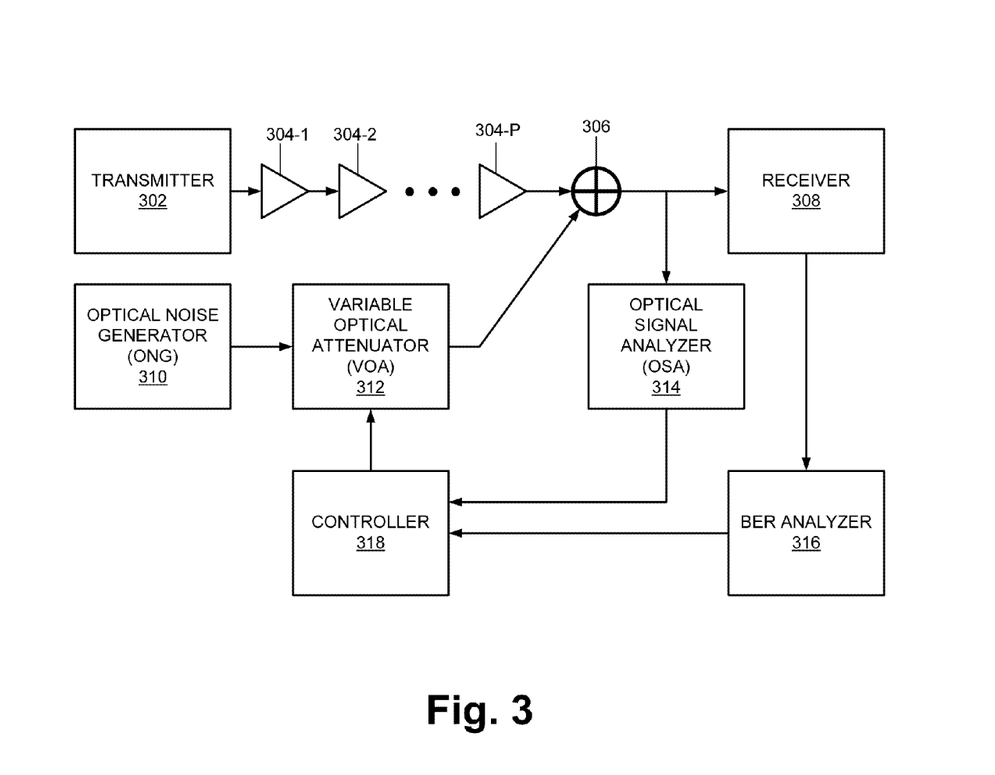
FIG. 3 illustrates an exemplary system for measuring BERs of forward error correction (FEC) code encoded signals.

FIG. 3 illustrates an exemplary system 300 for measuring BERs of FEC code encoded signals. As described above, devices in system 300 may be distributed over different central office hubs 210 and/or access points 212. As shown, system 300 may include optical transmitter 302, optical devices 304-1 through 304-P (collectively referred to as optical devices 304 and individually as optical device 304-x), optical combiner 306, receiver 308, optical noise generator 310, variable optical attenuator 312, optical signal analyzer 314, BER analyzer 316, and controller 318. Depending on the implementation, system 300 may include additional or different components than those illustrated in FIG. 3.

Transmitter 302 may encode data into FEC code encoded data, convert the encoded data into an optical signal, and transmit the optical signal toward receiver 308. Transmitter 302 may be part of non-optical device (e.g., a computer) or another optical device, such as an optical switch, optical line terminal, etc.

Optical devices 304 may include passive and/or active optical devices, such as optical amplifiers, regenerators, switches, etc. Optical devices 304 may be cascaded such that the output of optical device 304-x may feed the input of another optical device 304-y. The first optical device 304-1 in the cascade may receive its input from transmitter 302, and the last optical device 304-P may provide output to optical combiner 306.

Optical combiner 306 may combine noise from variable optical attenuator 312 and the signal from optical device 304-P and output the combined optical signal to receiver 308 and optical signal analyzer 314. Different implementations of optical combiner 306 may combine the noise and the signal in different ways. For example, combiner 306 may add, multiply, subtract, and/or convolve the noise and the signal from variable optical attenuator 312 and optical device 304-P to generate the output.

Receiver 308 may receive the combined optical signal from optical combiner 306, convert the received optical signal into an encoded signal, and decode the encoded signal. Receiver 308 may be part of another non-optical device (e.g., computer) or another optical device, such as an optical switch, line terminal, etc. Receiver 308 may send the decoded data to BER analyzer 316.

Optical noise generator 310 may generate and provide optical noise (e.g., Gaussian noise) to variable optical at attenuator 312. Depending on the implementation, some characteristics of optical noise generator 310 may be tunable (e.g., power spectral density over a given frequency band). Variable optical attenuator 312 may attenuate (e.g., dampen) the power of noise generated by optical noise generator 310 and output the attenuated noise. Variable optical attenuator 312 may provide the attenuated noise to optical combiner 306.

Optical signal analyzer 314 may receive the output of optical combiner 306, determine the SNR (e.g., the combined power of the signal and noise), and provide the SNR to controller 318. BER analyzer 316 may determine BERs based on the decoded data from receiver 308. In one implementation, BER analyzer 316 may compare the data from receiver 308 to a copy or original data that is encoded and sent at transmitter 302. BER analyzer 316 may provide the determined BERs to controller 318.

Controller 318 may receive input from different test devices (e.g., optical signal analyzer 314, BER analyzer 316, etc.) and record data from the test devices. For example, in one implementation, controller 318 may receive the outputs of optical signal analyzer 314 and BER analyzer 316.

In one implementation, controller 318 may set SNRs by controlling variable optical attenuator 312 and receive BERs that correspond to the SNRs in accordance with a specific scheme. For example, assume that a current noise level setting at variable optical attenuator 312 is represented by NL, $NL_P$ represents a prior noise level setting, and $\beta$ represents a constant. Then, controller 318 may determine NL in accordance with:

$$NL = NL_P + \beta. \quad (1)$$

Assuming that controller 318 begins BER measurements for SNRs at NL=N0 (some constant), controller 318 may repeatedly apply expression (1) to obtain different noise level settings at variable optical attenuator 312. For each noise level setting NL, controller 318 may obtain a SNR and BER from optical signal analyzer 314 and BER analyzer 316 and record the SNR and BER. In this manner, controller 318 may obtain BERs over different SNRs to generate a plot of SNR v. BER, similar to curve 120 shown in FIG. 1B.

Figure 4A:
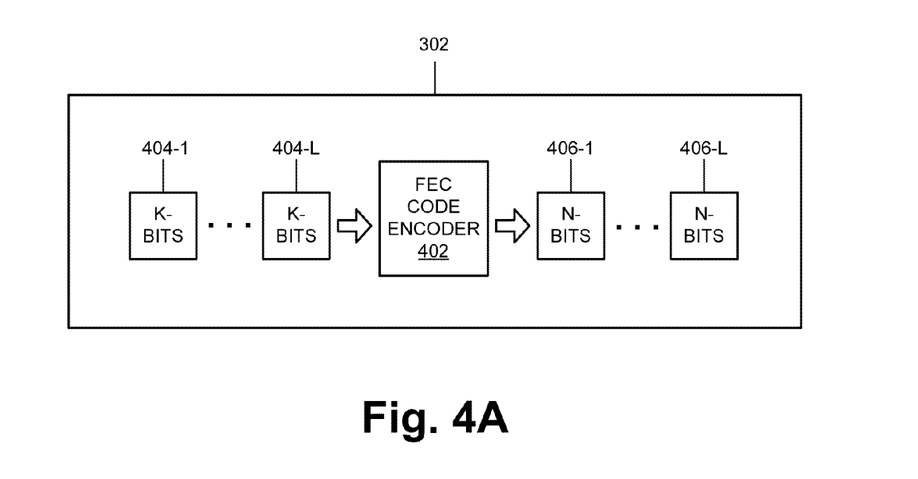
FIGS. 4A and 4B illustrate exemplary functional components of a transmitter and receiver of FIG. 3, respectively.

FIG. 4A shows a FEC encoder that may be included in transmitter 302 to improve BER in communication between transmitter 302 and receiver 308. Although transmitter 302 may include other components (e.g., a modulator, optical transmitter, etc.), they are not illustrated for the purposes of simplicity and ease of understanding. As shown, transmitter 302 may include a FEC code encoder 402. Although FEC code encoder 402 may generate different types of codes (e.g., block codes, convolutional codes, etc.) depending on the implementation, in the following, it is assumed that FEC code encoder 402 generates block codes.

FEC code encoder 402 receives a data stream that is aggregated into blocks, which are illustrated as K-bit blocks 404-1 through 404-L. For each of K-bit blocks 404, FEC code encoder 402 may generate a corresponding N-bit block 406-x. For L K-bit blocks 404, FEC code encoder 402 may output L N-bit blocks 406, where N>K (e.g., N=5, K=3). Transmitter 302 may convert N-bit blocks into signal and output the signal (not shown).

Figure 4B:
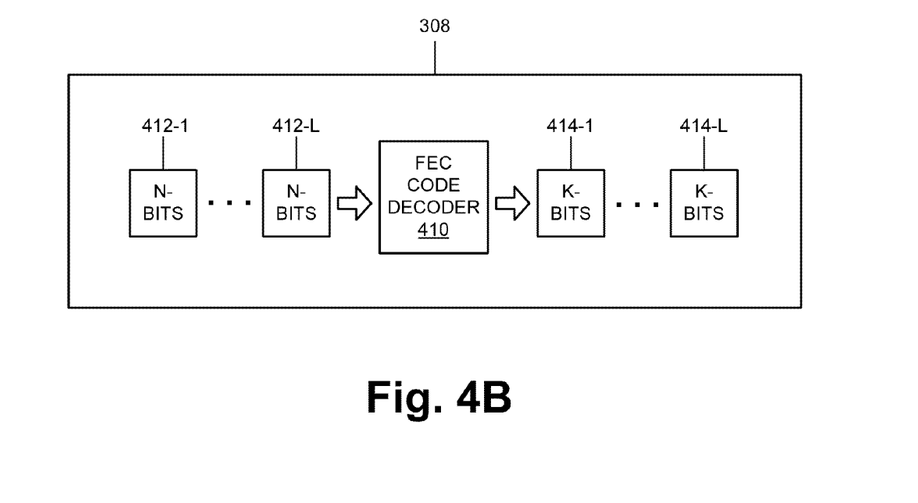

FIG. 4B shows a FEC code decoder that may be included in receiver 308. Although receiver 308 may include other components (e.g., a demodulator, optical receiver, etc.), they are not illustrated for the purposes of simplicity and ease of understanding. As shown, receiver 308 may include a FEC code decoder 410. Although FEC code decoder 410 may decode different types of codes (e.g., block codes, convolutional codes, etc.) depending on the implementation, in the following, it is assumed that FEC code decoder 410 decodes block codes.

After receiver 308 receives the signal from combiner 308, receiver 308 may obtain blocks 412 of N-bit encoded data from the signal. FEC code decoder 410 may decode each of N-bit blocks 412 to generate a corresponding K-bit block 414-x. Thus, for L N-bit blocks 412, FEC code decoder 410 may output L K-bit blocks 414. Receiver 308 may send K-bit blocks 414 (e.g., decoded data) to BER analyzer 316.

Figure 5:
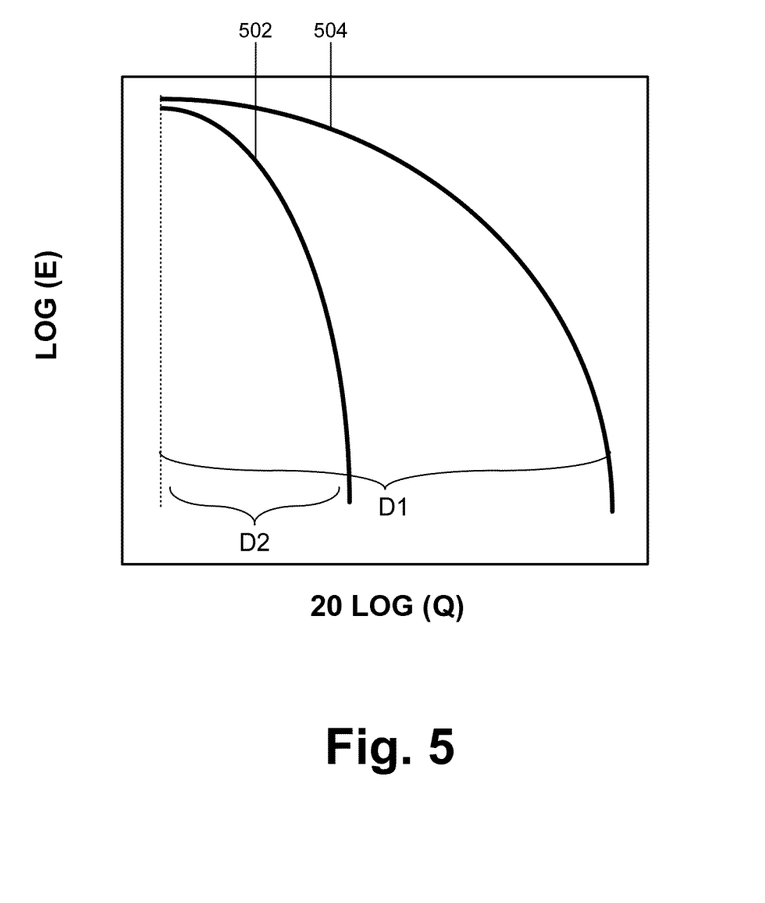
FIG. 5 shows graphs of BER as functions of SNR.

FIG. 5 shows graphs of BER as functions of SNR. BER curve 502 may be generated based on data collected at controller 318 of system 300. BER curve 504 may be generated from data collected in a system that does not include a FEC code encoder and FEC code decoder. As shown, while BER curve 504 spans approximately a SNR range of D1, BER curve 502 spans a smaller SNR range D2. Because D1 (e.g., a range over which BER is measured) is relatively small in typical communication systems with FEC coders/decoders, measuring BER can be difficult. System 300, for example, may be sensitive to small changes in SNR, and therefore, it may be difficult for controller 318 to collect accurate BER over SNR range D1.

Figure 6:
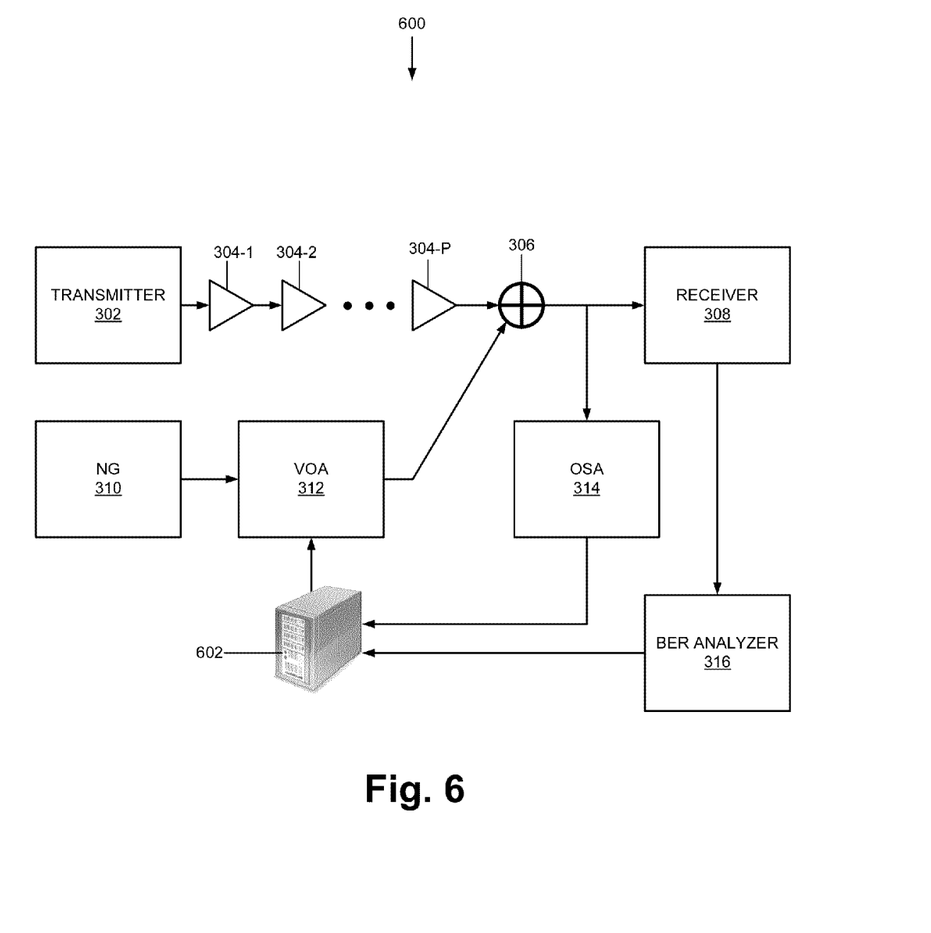
FIG. 6 illustrates another exemplary system for measuring BERs of FEC code encoded signals.

FIG. 6 illustrates an exemplary system 600 for accurately measuring BERs of FEC code encoded signals. As shown, system 600 may include devices 302-316. In addition, in contrast to system 300, system 600 may include controller 602 in place of controller 318. Controller 602 may receive data from optical signal analyzer 314 and BER analyzer 316 and record the data.

In addition, controller 602 may determine the amount of attenuation that may be applied to noise from optical noise generator 310, and use the determined amount of attenuation to control variable optical attenuator 312. In effect, controller 602 may control variable optical attenuator 312 with negative feedback from optical signal analyzer 314. This may allow controller 602 to provide a stable SNR for each BER measurement.

For example, assume that NL represents a current noise level setting at variable optical attenuator 312; $NL_P$ represents a prior noise level setting; $\beta$ represents a constant; $S_P$ represents a measured SNR from optical signal analyzer 314; and $f$ represents a function of $S_P$. Then, controller 602 may determine NL in accordance with:

$$NL = NL_P + \beta - f(S_P). \quad (2)$$

Assuming that controller 602 begins BER measurements for SNRs at NL=N0 (some constant), controller 602 may repeatedly apply expression (2) to obtain different noise level settings. For each noise setting NL, controller 602 may set variable optical attenuator 312 at NL, and record the measured BER provided by BER analyzer 316. In this manner, controller 602 may obtain BERs over different SNR to generate a plot of SNR v. BER, similar to curve 502 shown in FIG. 5.

Figure 7:
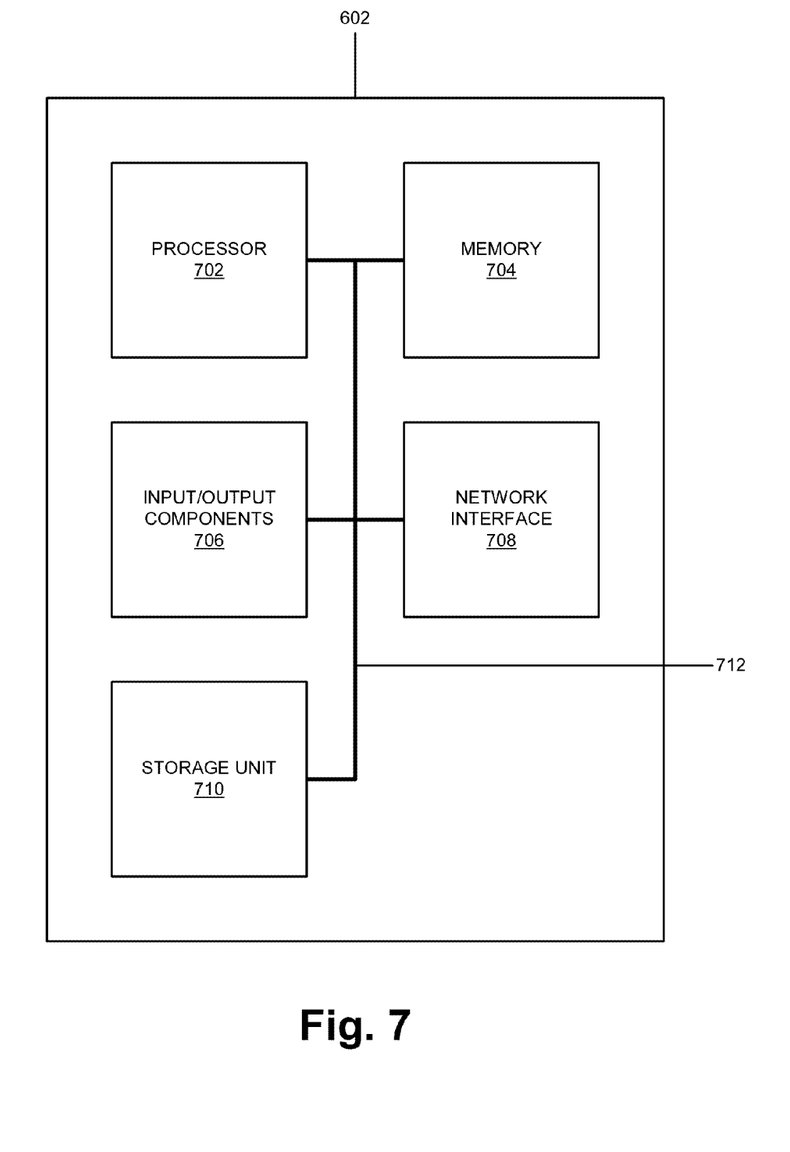
FIG. 7 is a block diagram of an exemplary controller of FIG. 6.

FIG. 7 is a block diagram of controller 602. As shown, controller 602 may include a processor 702, a memory 704, input/output components 706, a network interface 708, a storage unit 710, and a communication path 712. In different implementations, controller 602 may include additional, fewer, or different components than the ones illustrated in FIG. 7. For example, controller 602 may include line interfaces, such as interfaces for receiving and forwarding data.

Processor 702 may include a processor, a microprocessor, an Application Specific Integrated Circuit (ASIC), a Field Programmable Gate Array (FPGA), and/or other processing logic capable of controlling controller 602. Memory 704 may include static memory, such as read only memory (ROM), and/or dynamic memory, such as random access memory (RAM), or onboard cache, for storing data and machine-readable instructions.

Input/output components 706 may include a display screen, a keyboard, a mouse, a speaker, a microphone, a DVD writer, a DVD reader, Universal Serial Bus (USB) lines, and/or other types of components for converting physical events or phenomena to and/or from digital signals that pertain to controller 602.

Network interface 708 may include any transceiver-like mechanism that enables controller 602 to communicate with other devices and/or systems. For example, network interface 708 may include mechanisms for communicating via a network, such as the Internet, a terrestrial wireless network (e.g., a WLAN), etc. Additionally or alternatively, network interface 708 may include a modem, an Ethernet interface to a LAN, and/or an interface/connection for connecting controller 602 to other devices (e.g., a Bluetooth interface).

Storage unit 710 may include storage devices, such as a hard disk, floppy disk, CD ROM, CD read/write (R/W) disc, and/or flash memory, as well as other types of storage devices. Communication path 712 may provide an interface through which components of controller 602 can communicate with one another.

Figure 8:
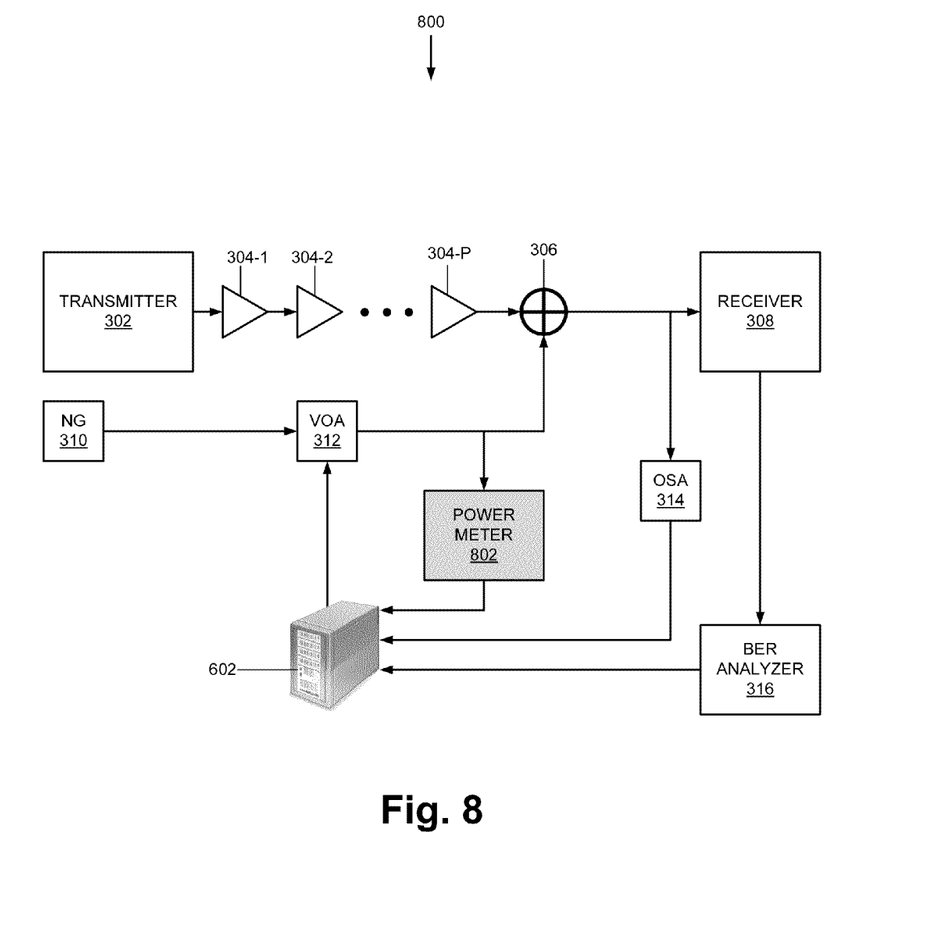
FIGS. 8 and 9 illustrate additional exemplary systems for measuring BERs of FEC code encoded signals.

FIG. 8 illustrates another exemplary system 800 for accurately measuring BERs of FEC code encoded signals. As shown, system 800 may include devices 302-316 and controller 602. In addition, in contrast to system 600, system 800 may further include power meter 802. Power meter 802 may receive the output of variable optical attenuator 312 and provide measured power level of the attenuated noise (i.e., the power of the output of variable optical attenuator 312) to controller 602.

In system 800, controller 602 may determine the amount of attenuation that may be applied to noise from optical noise generator 310 based on readings of noise power from power meter 802 and measured SNR from optical signal analyzer 314. This way, controller 602 may drive system 800 to provide a faster response to noise fluctuations than system 600 for maintaining SNR stable for each BER measurement.

Accordingly, controller 602 in system 800 may use, in place of (2), a different expression to determine the noise level settings. For example, assume that NL represents a current noise level setting at variable optical attenuator 312; $NL_P$ represents a prior noise level setting; $\beta$ represents a constant; $S_P$ represents measured SNR from optical signal analyzer 314; $P_N$ represents the power of noise as measured by power meter 802; and $f$ represents a function of $S_P$ and $P_N$. Then, controller 602 may determine NL in accordance with the following expression.

$$NL = NL_P + \beta - f(S_P, P_N). \quad (3)$$

Controller 602 in system 800 may operate similarly as controller 602 in system 600 to measure BER as a function of SNR, in accordance with expression (3).

Figure 9:
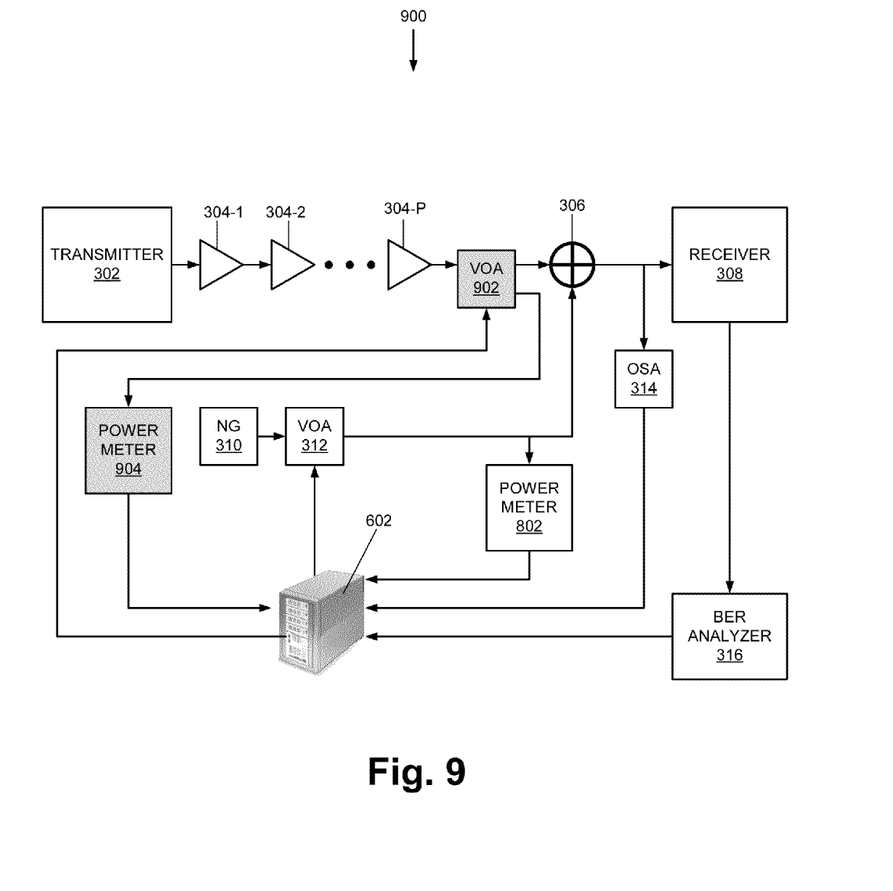

FIG. 9 illustrates yet another exemplary system 900 for accurately measuring BERs of FEC code encoded signals. As shown, system 900 may include devices 302-316, controller 602, and power meter 802. In addition, in contrast to system 800, system 900 may include a variable optical attenuator 902 and power meter 904. Variable optical attenuator 902 may control (i.e., attenuate) the output of optical device 304-P. The attenuated output may be provided to combiner 306 and to power meter 904. Power meter 904 may receive the output of variable optical attenuator 902 and provide measured power of the output to controller 602.

In system 900, controller 602 may determine the amount of attenuation that may be applied to signal from optical device 304-P and noise from optical noise generator 310 based on readings of noiseless signal power from power meter 904, noise power from power meter 802, and measured SNR from optical signal analyzer 314. Therefore, controller 602 may drive system 900 to provide a faster response to both noise and signal power fluctuations to maintain a stable SNR for each BER measurement than system 800.

Accordingly, controller 602 in system 900 may use, in place of (3), a different expression to determine the noise level and signal level settings. For example, assume that NL represents a current noise level setting at variable optical attenuator 312; $NL_P$ represents a prior noise level setting; $\beta$ represents a constant; $S_P$ represents measured signal power from optical signal analyzer 314; $P_N$ represents the power of noise as measured by power meter 802; $P_S$ represents the power of noiseless signal as measured by power meter 904; and $f$ represents a function of $S_P$, $P_N$, and $P_S$. Then, controller 602 may determine NL in accordance with the following expression.

$$NL=NL_P+\beta-f(S_P,P_N,P_S). \quad (4)$$

In addition, controller 602 in system 900 may determine appropriate signal level settings for noiseless signal that is input to combiner 306 from variable optical attenuator 902 in accordance with an expression similar to (4). For example, assume that SL represents a current noiseless signal level; $SL_P$ represents a prior noiseless signal level; δ represents a constant; and g represents a function of $S_P$, $P_N$, and $P_S$. Then, controller 602 may determine SL in accordance with the following expression.

$$SL=SL_P+\delta-g(S_P,P_N,P_S). \quad (5)$$

Figure 10:
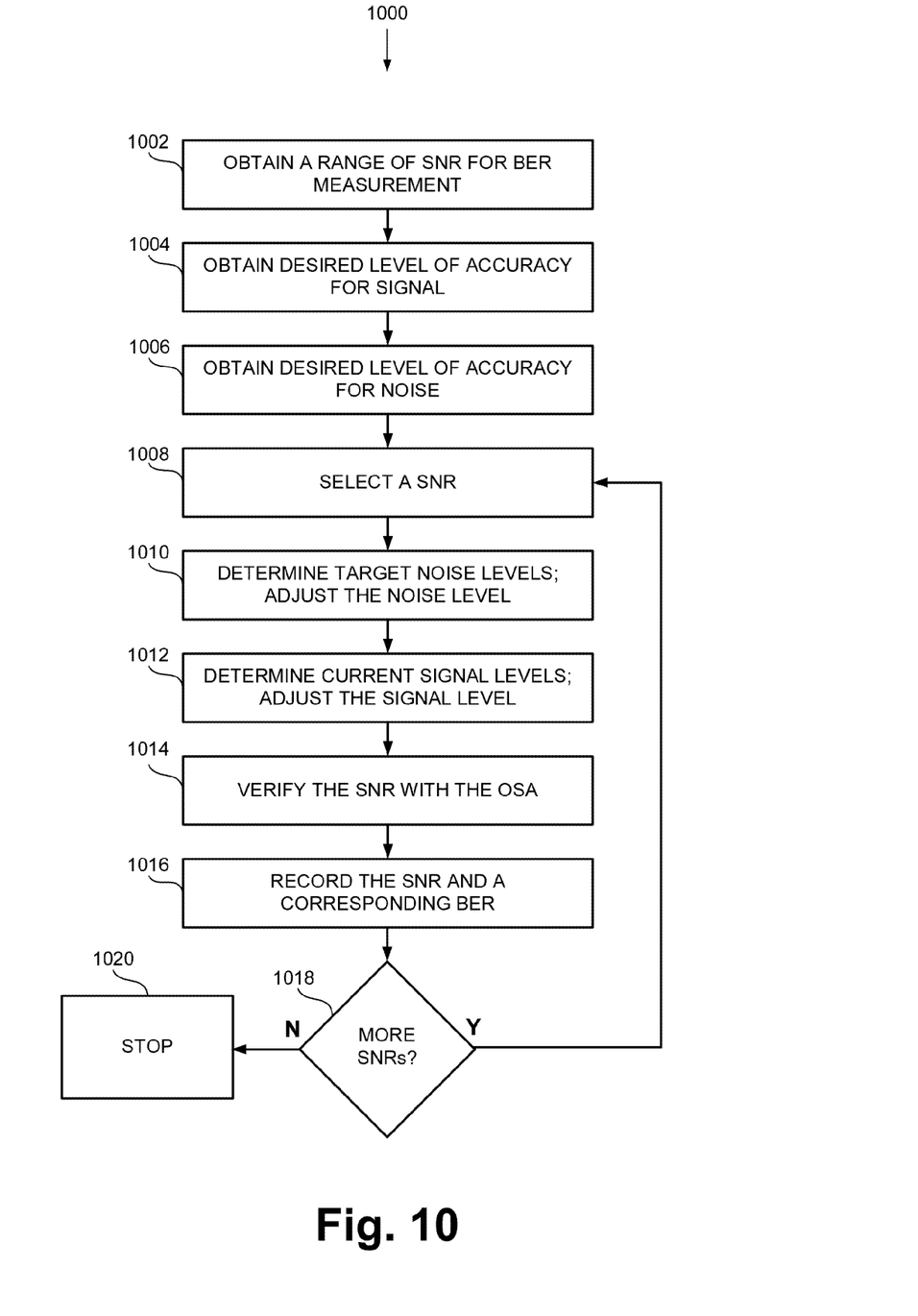
FIG. 10 is a flow diagram of an exemplary process for measuring BERs of FEC code encoded signals.

FIG. 10 is a flow diagram of an exemplary process 1000 associated with system 900 for accurately measuring BER of FEC code encoded signals. Process 1000 may start with controller 602 obtaining a range of SNR or a set of SNR points for BER measurements (block 1002). For example, depending on the implementation, controller 602 may obtain the range/points of SNR from a user via a graphical user interface (GUI), command line user interface, web server/client interface, an input file that contains the SNR ranges, etc.

Controller 602 may obtain a desired level of accuracy for a noiseless signal (block 1004) and controller 602 may obtain a desired level of accuracy for noise (block 1006). Controller 602 may obtain the levels of accuracy for the noiseless signal and noise in a manner similar to that used by controller 602 to obtain the SNR range at block 1002. In some implementations, controller 602 may also obtain a target signal level.

Controller 602 may select a SNR for measuring a BER (block 1008). For example, assume that at block 1002, controller 602 obtains a SNR range that corresponds to [1.58, 3.16]. In such an instance, controller 602 may select the first point 1.58 in the range [1.58, 3.16].

Controller 602 may determine a target noise level (block 1010). As shown in FIG. 9, controller 602 may determine the target noise level based on the selected SNR and cause variable optical attenuator 312 to provide noise at the target noise level. In addition, controller 602 may compare a measured noise level (e.g., the output of power meter 802) to the target noise level to further adjust the noise level (block 1010). For example, if the current noise level is greater than the target noise level calculated based on a selected SNR by more than the obtained level of accuracy (see block 1006), controller 602 may increase the attenuation at variable optical attenuator 312 (e.g., abs(the target noise level−the current noise level) >the obtained level of accuracy).

Controller 602 may determine a current signal level (block 1012). As shown in FIG. 9, controller 602 may determine the current signal level based on the output of power meter 904. In addition, controller 602 may use the current signal level to adjust the signal level (block 1012). For example, if the current signal level is less than a target signal level (e.g., user selected signal level) by more than the obtained level of accuracy (see block 1004), controller 602 may decrease the attenuation at variable optical attenuator 902 (e.g., abs(the target signal level−the current signal level)>the obtained level of accuracy).

Controller 602 may verify the SNR with optical signal analyzer 314 (block 1014). For example, controller 602 may determine whether the selected SNR and the SNR from optical signal analyzer 314 is within a particular tolerance. Controller 602 may continue to adjust noise and signal levels until the SNR provided by optical signal analyzer 314 is at or maintained at the selected SNR within a tolerance.

Controller 602 may record the SNR and a corresponding BER that is determined by BER analyzer 316 (block 1016). The recorded SNR may be the selected SNR (e.g., the target SNR), may be obtained from optical signal analyzer 314; or may be calculated based on the measured noise level and signal level. Subsequently, controller 602 may determine whether there are additional SNR values for which BERs may be obtained (block 1018).

If there are additional SNR values (block 1018—YES), process 1000 may return to block 1008. Otherwise (block 1018—NO), process 1000 may terminate (block 1020).

In the above, process 1000 illustrates how system 900 may accurately measure BER of FEC code encoded signals. More generally, in each of systems 600, 800, and 900, controller 602 may obtain accurate BER measurements of signal by using noise, signal, and SNR measurements to stabilize the SNRs of the signal. In system 600, controller 602 may use variable optical attenuator 312 to maintain SNRs for signals with slowly fluctuating noise. In system 800, controller 602 may measure noise levels (e.g., noise power) and use the measurements to drive variable optical attenuator 312 with a fast response, to control faster fluctuating noise. In system 900, controller 602 may measure both noise and signal levels, and use the measurements to drive variable optical attenuators 312 and 902. System 900 may remove almost all fluctuations in SNR, resulting in accurate BER measurements.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to the process illustrated in FIG. 10, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:
1. A device comprising:
one or more components configured to:
obtain, from a bit-error-rate analyzer, bit-error-rates of a signal, via a network interface, and obtain, from an optical signal analyzer, signal-to-noise ratios of the signal, via the network interface;
a user interface configured to:
receive a user-specified range of signal-to-noise ratio of the signal; and
a processor configured to:
select, from the user-specified range, a target signal-to-noise ratio for the signal,
determine a target noise level based on the target signal-to-noise ratio,
set a noise level of the signal to the target noise level,
determine a signal-to-noise ratio of the signal via the one or more components,
adjust the noise level of the signal, by an amount determined based on a difference between a noise level of the determined signal-to-noise ratio and the target noise level, to stabilize the determined signal-to-noise ratio within a particular level of tolerance with respect to the target signal-to-noise ratio,
determine, responsive to the stabilization of the determined signal-to-noise ratio within the particular level of tolerance, a bit-error-rate of the signal via the one or more components, and
record the determined bit-error-rate.

2. The device of claim 1, wherein the signal carries forward error correction code (FEC) encoded data.

3. The device of claim 1, wherein when the processor adjusts the noise level, the processor is configured to control a variable optical attenuator that attenuates noise of the signal.

4. A device comprising:
one or more components to obtain bit-error-rates of a signal, signal-to-noise ratios of the signal, and noise levels of the signal; and
a processor configured to:
obtain, via a user interface associated with the device, a user-specified range of signal-to-noise ratio,
select, from the user-specified range, a target signal-to-noise ratio for the signal,
determine a target noise level based on the target signal-to-noise ratio,
set a noise level of the signal to the target noise level,
determine a noise level of the signal via the one or more components,
receive, via the user interface, a first user-specified level of accuracy for the noise level of the signal,
adjust the noise level of the signal, based on a difference between the determined noise level and the target noise level, to within the first user-specified level of accuracy, to stabilize a signal-to-noise ratio of the signal,
receive, via the user interface, a second user-specified level of accuracy for a power level of the signal,
control a variable optical attenuator that attenuates the signal, to adjust the power level of the signal to within the second user-specified level of accuracy,
obtain, via the one or more components, the signal-to-noise ratio,
determine whether the obtained signal-to-noise ratio is maintained within a particular tolerance level of the target signal-to-noise ratio,
determine, responsive to a determination that the obtained signal-to-noise ratio is maintained within the particular tolerance level of the target signal-to-noise ratio, a bit-error rate of the signal via the one or more components, and
record the bit-error-rate.

5. The device of claim 4, wherein the one or more components include a network interface configured to receive:
the bit-error-rate of the signal from a bit-error-rate analyzer,
the signal-to-noise ratio of the signal from an optical signal analyzer, and
the determined noise level of the signal from a power meter that measures noise levels of the signal.

6. The device of claim 4, wherein when the processor adjusts the power level of the signal, the one or more components are further configured to obtain the power level of the signal from a power meter; and
the processor is further configured to control the variable optical attenuator based on the obtained power level of the signal.

7. The device of claim 4, wherein the one or more components are further configured to obtain the power level of the signal, and wherein the processor is further configured to record at least one of:
the target signal-to-noise ratio;
a signal-to-noise ratio obtained via the one or more components; or
a signal-to-noise ratio that is calculated based on the determined noise level and the obtained power level of the signal.

8. The device of claim 4, wherein the signal includes an optical signal.

9. A method comprising:
obtaining, via a user interface associated with a device, a user-specified range of signal-to-noise ratio of a signal;
selecting a target signal-to-noise ratio in the user-specified range;
calculating a target noise level based on the target signal-to-noise ratio;
setting a noise level of the signal to the target noise level, wherein setting the noise level includes controlling a variable optical attenuator to attenuate noise in the signal;
receiving, via the user interface, a user-specified level of accuracy for the noise level;
adjusting the noise level of the signal, based on a difference between a measured value of the noise level and the target noise level, to within the user-specified level of accuracy;
calculating a current signal-to-noise ratio of the signal based on the measured value of the noise level and a measured power of the signal;
verifying whether the current signal-to-noise ratio of the signal is stabilized within a particular tolerance level of the target signal-to-noise ratio; and
recording, responsive to a verification that the current signal-to-noise ratio of the signal is stabilized within the particular tolerance level of the target signal-to-noise ratio, a bit-error-rate of the signal and at least one of the target signal-to-noise ratio or the current signal-to-noise.

10. The method of claim 9, further comprising:
receiving, via the user interface, a user specified level of accuracy of a power level of the signal;
measuring a value of the power level of the signal; and
using the measured value to control the power level of the signal within the user-specified level of accuracy of the power level of the signal.

* * * * *